United States Patent [19]

Kato et al.

[11] Patent Number: 4,732,047

[45] Date of Patent: Mar. 22, 1988

[54] STRUCTURE OF A SHOE FOR A SWASH PLATE TYPE COMPRESSOR

[75] Inventors: Masafumi Kato; Kouichi Shimomura; Masayuki Nagura; Katumi Asai, all of Kariya, Japan

[73] Assignee: Kabushiki Kaisha Toyoda Jidoshokki Seisakusho, Aichi, Japan

[21] Appl. No.: 897,550

[22] Filed: Aug. 15, 1986

[30] Foreign Application Priority Data

Aug. 16, 1985 [JP] Japan .................. 60-180321
Aug. 16, 1985 [JP] Japan .................. 60-180322

[51] Int. Cl.⁴ .................. F04B 1/16; F16C 17/06; F16C 33/24
[52] U.S. Cl. .................. 74/60; 384/907.1; 384/912; 384/913; 403/30; 403/274; 403/361; 403/404; 417/269
[58] Field of Search .................. 74/60; 92/71; 29/525; 384/42, 907.1, 912, 913; 403/30, 274, 361, 404; 417/269

[56] References Cited

U.S. PATENT DOCUMENTS

| | | | |
|---|---|---|---|
| 4,037,522 | 7/1977 | Inoshita et al. | 417/269 X |
| 4,205,423 | 6/1980 | Poole et al. | 29/525 X |
| 4,285,640 | 8/1981 | Mukai | 417/269 |
| 4,329,913 | 5/1982 | Nakayama et al. | 417/269 |
| 4,614,453 | 9/1986 | Tsuno et al. | 403/404 X |
| 4,659,245 | 4/1987 | Hirao et al. | 403/30 |

FOREIGN PATENT DOCUMENTS

57-76281 5/1982 Japan .................. 417/269
58-163820 9/1983 Japan .................. 384/42

Primary Examiner—Allan D. Herrmann
Attorney, Agent, or Firm—Burgess, Ryan and Wayne

[57] ABSTRACT

A shoe incorporated into a swash plate type compressor as a drive force transmitting element intervened between a rotatable swash plate and a reciprocal piston has a first member made of a seizure-resistant material such as ceramic and hard metal, and has a flattened contact face in slidable contact with the swash plate, and a second member made of less seizure-resistant material but easily machined and having a spherical bearing face slidably engaged with the piston, the first and second members being joined together to form a unitary element.

4 Claims, 12 Drawing Figures

STRUCTURE OF A SHOE FOR A SWASH PLATE TYPE COMPRESSOR

FIELD OF THE INVENTION

The present invention relates to a swash plate type compressor for use in air conditioning systems for vehicles and, in particular, to an improved structure of the shoes incorporated into a swash plate type compressor for providing a means of enhancing resistance to seizure of the shoes due to high speed running of the swash plate compressor.

BACKGROUND OF THE INVENTION

A typical structure of a shoe for a swash plate type compressor is disclosed in, for example, U.S. Pat. No. 4,329,913 of Nakayama et al. The compressor has a pair of horizontally axially aligned cylinder blocks which form a combined block. Inside the combined block are formed axially extending cylinder bores, and the cylinder block is closed at both ends by front and rear housings via valve plates. Passing centrally through the combined block, a drive shaft is rotatably supported by a suitable bearing means. To the middle of the drive shaft is fixed a swash plate operatively connected, via ball bearings and shoes, to double acting pistons slidably fitted in the cylinder bores. Thus, the rotating motion of the swash plate causes the reciprocal compressing motion of the pistons within the cylinder bores. The front and rear housings have refrigerant suction chambers and refrigerant discharge chambers, which are interconnected with the cylinder bores and are connectable to an outside air conditioning system by means of appropriate refrigerant flow pipelines. The above-mentioned respective shoes are normally shaped as a round plate having, at one side thereof, a flattened face slidably in contact with the face of the swash plate. At the other side of the round plate, each shoe has a recess for receiving therein a part of the ball bearing engaged with a spherical recess of the piston.

Another conventional swash plate type compressor employs different type of shoes, each having, at one side thereof, a flattened face slidably in contact with a swash plate, and at the opposite side thereof, a spherical raised portion directly engaged with a double acting reciprocatory piston without the intervention of a ball bearing. Thus, the swash plate is operatively connected to the piston by only the shoes alone, eliminating the need to provide ball bearings.

With the above-mentioned conventional swash plate type compressors, there is a recent practical requirement such that the compressors are operated at a high compression ratio so as to increase a refrigeration efficiency of the airconditioning system. As a result, it is necessary that the shoes for the swash plate type compressor have sufficient resistance to seizure under a running condition of the compressor at a high compression ratio. One proposal for satisfying this necessity is to employ shoes made of a material having a sufficient resistance to seizure, such as various kinds of ceramic, and hard metal. However, these seizure-resistant materials usually are not easily machined, and therefore, a satisfactory accuracy of the dimensions of the shoes cannot be obtained. Accordingly, the use of these seizure-resistance materials for the shoes is considered impracticable. At this stage, from the past experience of the present inventors, it is understood that although the flattened face of the shoe in contact with the swash plate must resist seizure, the other recessed or raised side of the shoe may have less resistance to seizure. It is understood that machining the flattened face of the shoe is easier than machining the recessed or raised side of the shoe. Consequently, the present inventors have contrived to produce shoes having a flattened face made of seizure-resistant material and in contact with the swash plate face, and a recessed or raised side made of material having less resistance to seizure but easily machined.

SUMMARY OF THE INVENTION

Accordingly, an object of the present invention is to provide a novel structure of a shoe for use in a swash plate type compressor, with which the conventional structure of the shoe is improved so as to be resistant to seizure under a running condition of the compressor at a high compression ratio.

In accordance with the present invention, there is provided a shoe incorporated into a swash plate type compressor for transmitting an axial force from a rotating swash plate secured to a drive shaft to a piston of the compressor, which applies an axially reciprocal compression effect to a refrigerant within a cylinder bore of the compressor. The shoe is characterized by comprising: a first member made of a seizure-resistant material and having a first flattened face in slidable contact with the swash plate while the swash plate rotates with the drive shaft and a second face opposite to the first flattened face; a second member made of a material which has less resistance to seizure than the first member but is more easily machined than the seizure-resistant material of the first member, the second member having a first spherical face slidably engaged with the piston and a second face opposite to the first spherical face; and means for joining the first and second members together to form a unitary element.

Preferably, the first member is formed as a generally round plate member made of a ceramic material, and the second member is made of a ferrous metal.

BRIEF DESCRIPTION OF THE DRAWINGS

The present invention will become more apparent from the accompanying drawings, wherein.

DESCRIPTION OF THE PREFERRED EMBODIMENTS

Figure 1:
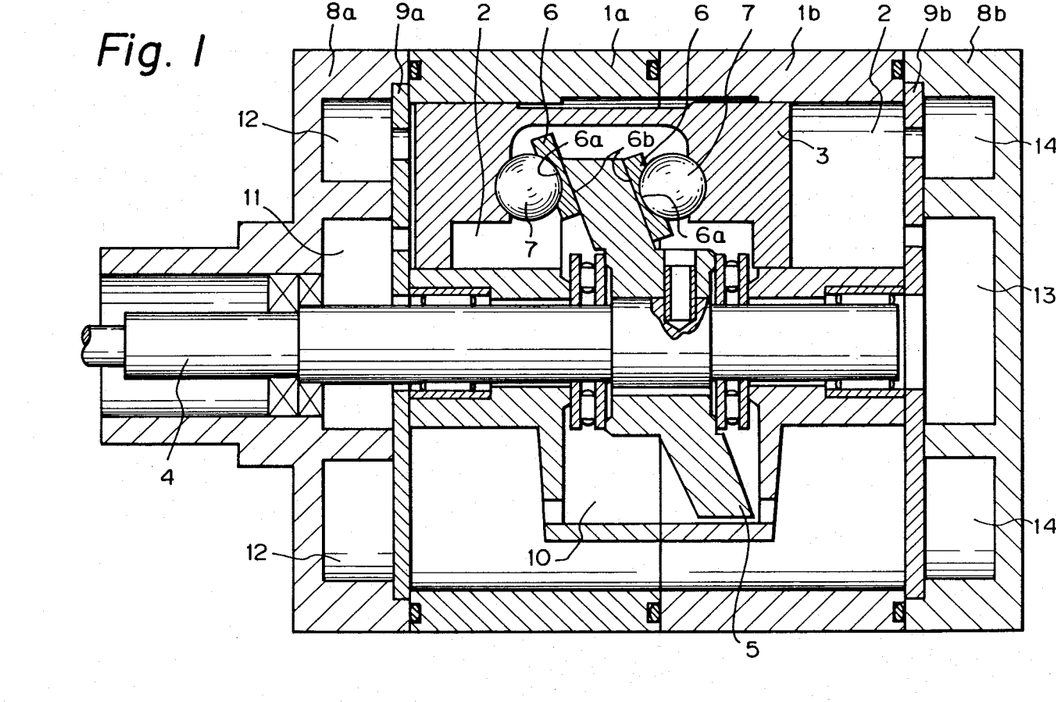
FIG. 1 is a longitudinal cross-sectional view of a typical swash plate type compressor.

Referring to FIG. 1, illustrating a typical swash plate type compressor for use in a vehicle airconditioning system, the compressor has a pair of cylinder blocks, i.e., a front cylinder block 1a and a rear cylinder block 1b, combined together in an axial alignment to thereby form a combined cylinder block. The combined cylinder block is provided with axially extending cylinder bores 2 arranged in parallel with each other around the central axis of the combined cylinder block. The front end of the combined cylinder block is closed by a front housing 8a, via a valve plate 9a, and the rear end of the combined cylinder block is closed by a rear housing 8b, via a valve plate 9b. Passing coaxially through both cylinder blocks 1a and 1b, front housing 8a, and front valve plate 9a, a drive shaft 4 is rotatably supported by a suitable bearing means, and is provided with a swash plate 5 secured to the middle of the drive shaft 4. The swash plate 5 is operatively connected, via ball bearings 7 and shoes 6, with double acting multi-pistons 3 which are slidably fitted in the cylinder bores 2. The combined cylinder block is also provided with a swash plate chamber 10, past which the swash plate 5 rotates with the drive shaft 4. The front and rear housings 8a and 8b have refrigerant suction chambers 11 and 13, respectively, through which the refrigerant returned from an outside airconditioning system is eventually sucked into the cylinder bores 2 to be compressed. The front and rear housings 8a and 8b also have refrigerant discharge chambers 12 and 14, respectively, through which the compressed refrigerant is discharged toward the outside airconditioning system. The compression of the refrigerant is attained by the reciprocal compressing motion of the pistons 3 within the cylinder bores 2, which is caused by the motion of the swash plate 5 rotating with the drive shaft 4. That is, an axial force for causing the reciprocal compressing motion of the pistons 3 is transmitted from the swash plate 5 to the pistons 3 by means of the shoes 6 and ball bearings 7. Each of the shoes 6 is a generally round plate element having one face thereof formed with a spherical recess 6a to receive therein the ball bearing 7, and the other face thereof formed as a flattened face 6b in slidable contact with the swash plate.

With the above-mentioned construction of the swash plate type compressor, when it is operated at a high compression ratio, since the flattened face 6b of each shoe 6 is always subjected to a high friction, the flattened face 6b must be resistant to seizure possibly caused by a high friction heat.

Figure 2:
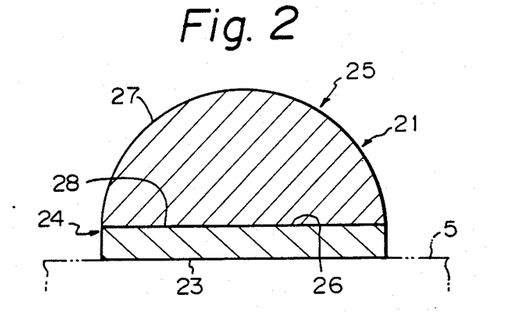
FIG. 2 is an enlarged cross-sectional view of a shoe according to a first embodiment of the present invention.
Figure 2A:
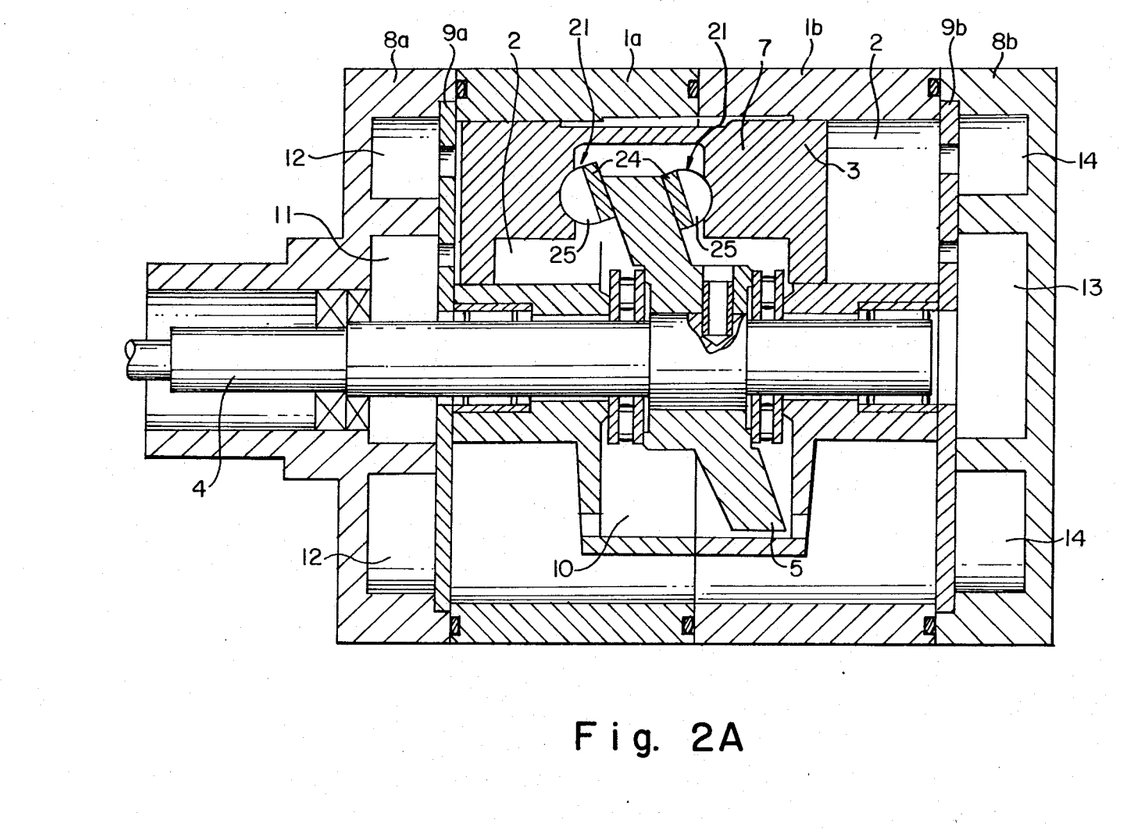
FIG. 2A is a longitudinal cross-sectional view of a swash plate type compressor using the shoe of FIG. 2.

FIG. 2 illustrates the shoe of a first embodiment of the present invention. The shoe 21 is provided with a first member 24 having a flattened contact face 23 in slidable contact with a face of a swash plate 5 of a swash plate type compressor, and a second member 25 having a spherically convexed bearing face 27 slidably engaged with a spherical socket of a piston 3 (see FIG. 1) of the compressor. The first and second members 24 and 25 are joined together so as to form a unitary element. That is, the shoe 21 formed as a unitary element has the function of a ball bearing as well as a slidable contact member.

The first member 24 is formed as a round plate member made of ceramic having an excellent resistance to seizure. Thus, the flattened face 23 is formed as a substantially plane face or a centrally slightly elevated face. The other face 26 opposite to the flattened face 23 is formed as a substantially plane face abutted to the second member 25. The ceramic material of the first member may be selected from an oxide ceramic, carbide ceramic, nitride ceramic, or other ceramic. That is, alumina, silicone carbide, silicone nitride, aluminum nitride, titanium carbide, boron carbide, zirconia, and SAIALON may be used for producing the first member 24. Also, hard metal may be employed for producing the first member 24.

The second member 25 formed as a half-sphere shape member is made of a ferrous metal which is used for producing the conventional shoe 6 (see FIG. 1) for the swash plate type compressor, so that the spherically convexed bearing face 27 may be easily and accurately formed by machining. The other face 28 of the second member 25 opposite to the spherically convexed bearing face 27 is formed as a substantially plane face so as to be joined to the plane face 26 of the first member 24. The ferrous material used for producing the second member 25 may be preferably selected from a bearing steel (Japanese Industrial Standard SUJ-2; ASTM 52100; DIN 100 Cr 6), and carbon steels for machine structural use (Japanese Industrial Standard S 15 C, S 45 C, S 55 C; AISI 1015, AISI 1045, AISI 1055; DIN CK 15, CIN CK 45, CIN C 55).

In the shoe of the first embodiment shown in FIG. 2, the first and second members are joined together by means of appropriate thermosetting adhesive.

With the above-mentioned shoe of the first embodiment, it should be understood that since the second member 25 slidably engaged with the piston of the compressor is made of the above-mentioned ferrous metal which is relatively easily machined, the accuracy of the dimension of the spherical bearing face 27 is high enough for compressor use. Further, as the bearing face 27 of the second member 25 slides in the socket of the piston, the ferrous material has a sufficient resistance to seizure. This is because the sliding condition between the second member 25 and the piston is less demanding than that between the first member 24 and the swash plate 5.

On the other hand, it will be understood that since the first member 24 having the flattened contact face 23 is made of high seizure-resistant ceramic, the occurrence of seizure at the contact portion of the first member 24 and the face of the swash plate can be prevented when the compressor is running at a high compression ratio. Further, although ceramic per se is hard to machine, the flattened face 23 which has a simple plane or slightly elevated shape can be machined without difficulty so that a desired accuracy of the dimension of the face 23 is acquired. As a result, the dimensional accuracy of the shoe 21 of the present embodiment can be equivalent to that of the combination of the conventional shoe and the bearing ball, and in addition, the resistance to seizure when the swash plate type compressor is running at a high compression ratio is superior to that of the combination of the conventional shoe and bearing.

Figure 3:
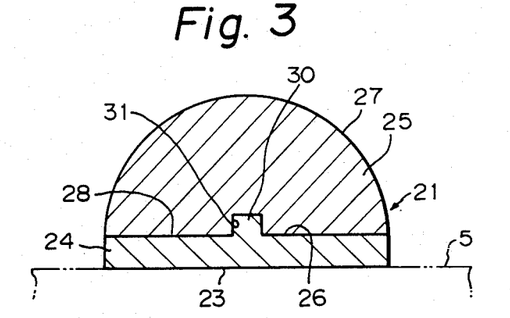
FIGS. 3 and 4 are enlarged cross-sectional views of shoes according to second and third embodiments of the present invention.

FIG. 3 illustrates a shoe of the second embodiment of the present invention. This embodiment is different from the first embodiment in that the face 26 of the first member 24 is formed with a central projection 30, and that the face 28 of the second member 25 is formed with a central recess 31 which is complementary with the central projection 30 of the first member 24. That is, in the second embodiment, the first and second members 24 and 25 are joined together by engagement of the projection 30 and the recess 31. The shape of the projection 30 and the recess 31 may be cylindrical or square. It should be understood that, although not illustrated, the shoe of the second embodiment may be modified in such a manner that the first member 24 is formed with a recess and the second member 25 is formed with a complementary projection engaged in the recess of the first member 24. Further, the engagement of the first and second members 24 and 25 may be strengthened by the use of an adhesive as required.

Figure 4:
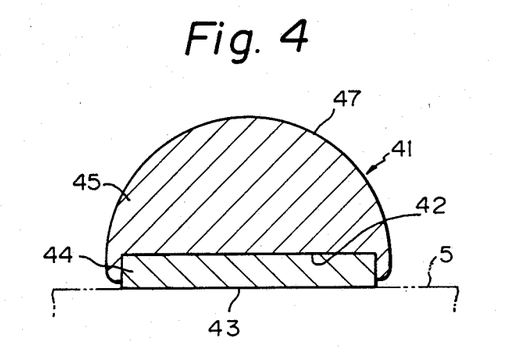

FIG. 4 illustrates a shoe of the third embodiment of the present invention. The shoe 41 of this embodiment includes a first member 44 formed as a round plate shape and a second member 45 holding the first member 44. The first member 44 has a flattened face 43 in slidable contact with the swash plate 5 of the compressor and is press-fitted into a round recess 42 formed in the face of the second member 45 opposite to a spherically convexed bearing face 47 of the member 45. The flattened face 43 of the first member 44, similar to the flattened face 23 of the first member 24 of the first and second embodiment, may be either a substantially plane face or a slightly outwardly elevated face. Alternately, it is possible to modify the shoe 41 of the third embodiment in such a manner that the second member 45 is press-fitted into the first member 44. Further, if preferable, the press-fitting engagement of the first and second members 44 and 45 may be strengthened by the use of an appropriate thermosetting adhesive.

With each of the shoes of the first through third embodiments of the present invention, although the second member 25 or 45 is provided with a spherically convexed bearing face 27 or 47 so as to eliminate the need to provide a ball bearing between the second member of the shoe and the piston, it may be possible to modify the construction of the second member 25 or 45 in such a manner that the member 25 or 45 is formed with a spherical socket to receive a ball bearing. In that case, the ball bearing is intervened between the second member 25 or 45 of the shoe and the piston in a similar manner to the combination of the conventional ball bearing and shoe, as shown in FIG. 1.

Figure 5:
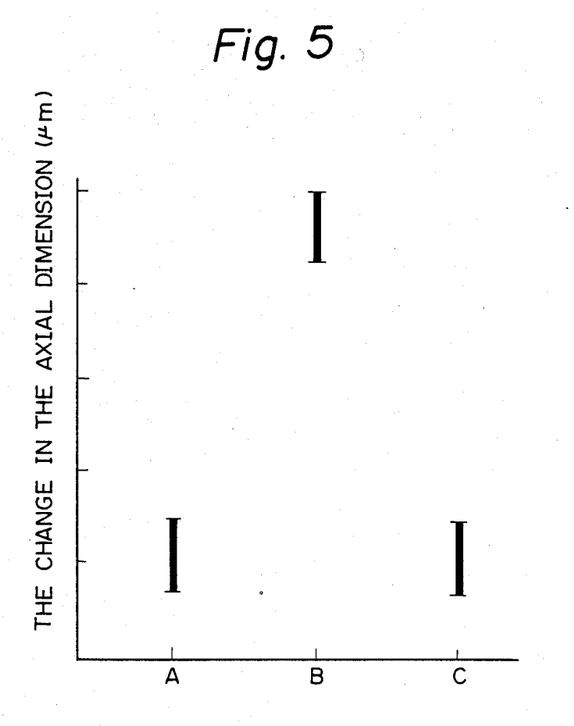
FIG. 5 is a diagram illustrating a result of a test measurement of a change in an axial dimension of each of three shoes A, B, and C according to the present invention.

FIG. 5 is a diagram illustrating a change in the axial dimension of the shoe A of the present invention and the shoes B and C as controls during a predetermined time period of test use in the swash plate type compressor. The shoe A of the present invention was provided with a first member made of alumina ceramic and a second member made of carbon steel of the afore-mentioned JIS S 45 C, while the shoe B was entirely made of the same ceramic as the first member of the shoe A and was formed as one part having no separate member. Further, the shoe C was entirely made of bearing steel of the afore-mentioned JIS SUJ 2, and was quenched and formed as one part.

Before the starting of the test, the spherically convexed bearing faces of the shoes A and C had a surface roughness Rz of 1.5 microns and a roundness of 3 microns, respectively. That is, the shoes A and C could be relatively accurately machined. On the other hand, the spherically convexed bearing face of the shoe B made of ceramic had a surface roughness of 3.0 microns and roundness of 40 microns. That is, the dimension of the shoe B was less accurate than the other two shoes A and C, due to the difficulty in the machining thereof. After the use of the three shoes A, B, and C for a predetermined time period, the change in the axial dimension of each of these shoes was measured as shown in FIG. 5. That is, the change in the axial dimensions of the shoes A and C were around 10 microns, while that of the shoe B was around 50 microns.

From the result of the measurement of FIG. 5, it is understood that the change in the axial dimension of the shoe B is very large. Thus, this shoe B is impractical for the purpose of incorporation into the swash plate type compressor. This is because such a large change in the axial dimension of the shoe B will result in occurrence of play between the shoe and the engaged piston. It is assumed that such a large change in the axial dimension occurred because the poor accuracy in the roundness of the shoe B resulted in abnormal local abrasion in the portion of the shoe B in contact with the piston, due to an uneven contact therebetween. It is further assumed that this was also attributable to the large roughness of the bearing face of the shoe B.

Although the shoe A of the present invention is provided with a first member made of ceramic material, the flattened face can be relatively easily and accurately machined. As a result, uneven contact between the first member of the shoe A and the swash plate did not occur, and therefore, local abrasion of the first member of the shoe A did not occur. Consequently, the change in the axial dimension of the shoe A was small. Therefore, it is understood that the shoe A of the present invention can be effectively used for the swash plate compressor.

In the case of the shoe C, since it was made of ferrous metal capable of being easily and accurately machined, the change in the axial dimension thereof was small.

Figure 6A:
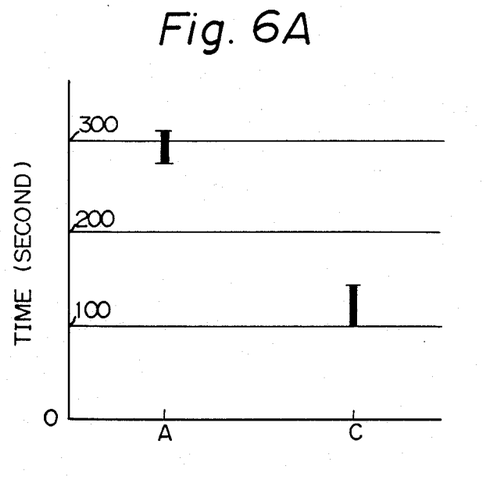
FIGS. 6A and 6B are diagrams illustrating the seizure-resistance property of the shoes A and C according to the present invention.
Figure 6B:
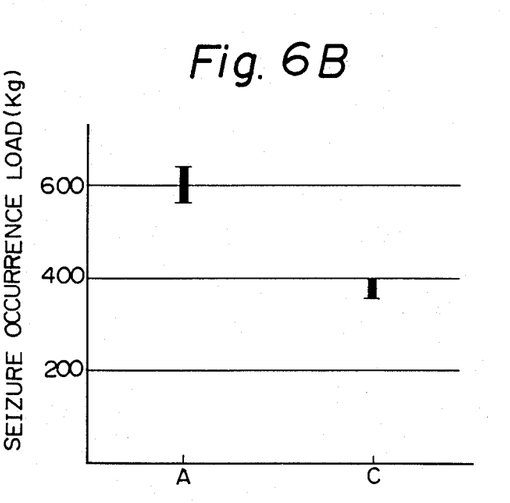

FIGS. 6A and 6B illustrate the measuring result of the seizure resistance of the above-mentioned shoes A and C, which had a small change in axial dimension as described above.

The diagram of FIG. 6A illustrates the result of a test wherein the shoes A and C initially supplied with a drop of lubricating oil were slid on a swash plate made of aluminum alloy at a relative speed of 5 m/sec under a load of 12 kg without supplying additional lubricating oil and the time intervals until seizure occurred between each of the shoes A and C and the swash plate were measured. From the illustration of FIG. 6A, it is readily understood that shoe A has an excellent resistance to seizure compared with shoe C.

The diagram of FIG. 6B illustrates the result of a test wherein the shoes A and C were slid on a swash plate with a constant lubricating condition under an initial load of 40 kg while increasing the load by 40 kg at each predetermined time interval; the final load causing seizure between each of the shoes A and C and the swash plate being measured. The relative sliding speed of the shoes A and C and the swash plate was 15 m/sec. From the illustration of FIG. 6B, it is also readily understood that the load durability of the shoe A is far superior to that of the shoe C. Thus, from the test results of FIGS.

6A and 6B, it should be understood that the shoe A of the present invention has an excellent resistance to seizure when incorporated in a swash plate type compressor.

Figure 7:
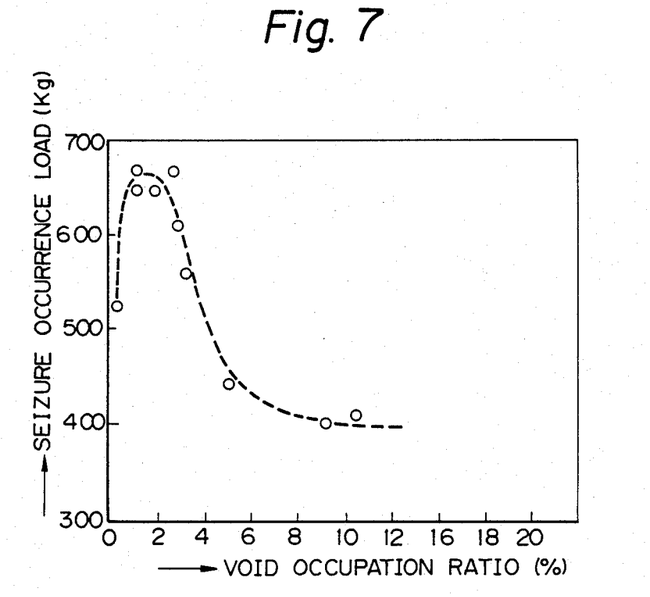
FIG. 7 is a diagram illustrating a result of measurement of the relationship between a void occupation ratio of the ceramic material and the seizure-resistance property of the shoes according to the present invention.

FIG. 7 is a diagram illustrating the result of a test wherein the shoe A of the present invention was slid on a swash plate under the same test condition as that of the test of FIG. 6B and the load at which seizure occurred was measured with a change in the void occupation ratio of the flattened face of the first member of the shoe A, i.e., a change in ratio of cavities or holes occupying a unit area of the flattened face of the shoe A made of various kinds of ceramic. From the illustration of FIG. 7, it will be understood that the void occupation ratio should be less than 10%, and that when the void occupation ratio is less than 4%, the shoe A is durable under a heavy load without causing seizure. Further, from FIGS. 6B and 7, it is understood that when the void occupation ratio is less than 4%, the shoe A has large resistance to seizure compared with the shoe C.

It should be understood from the test result of FIG. 7 that the tests conducted with FIGS. 6A and 6B were those wherein the shoe A employed had a void occupation ratio of approximately 3%.

Figure 8:
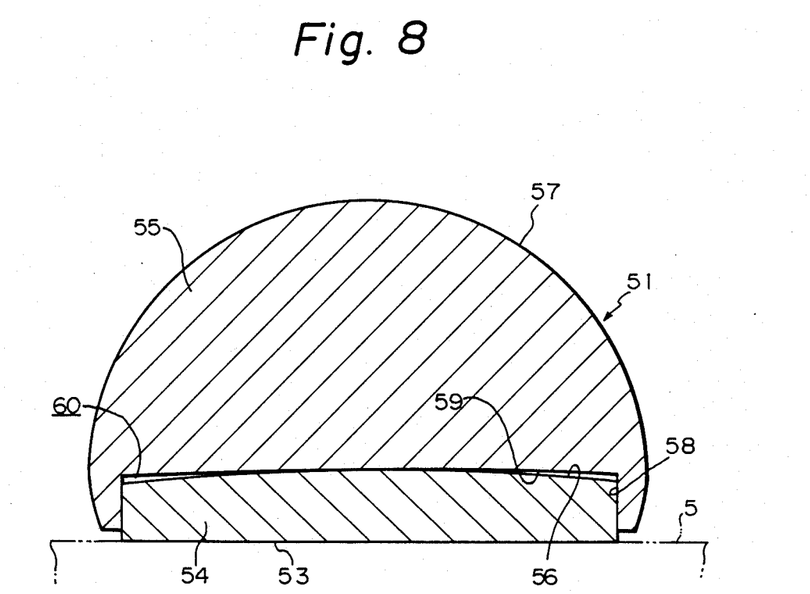
FIG. 8 is an enlarged cross-sectional view of a shoe according to a fourth embodiment of the present invention.

Referring to FIG. 8 illustrating a shoe 51 of the fourth embodiment of the present invention, the outer configuration thereof is substantially equal to the shoe 41 of the third embodiment of the present invention. However, the shoe 51 of the fourth embodiment is different from that of the third embodiment in that the press-fitting construction of a first member 54 made of ceramic or hard metal and a second member 55 made of ferrous metal is improved so that the center of a face 56 of the first member 54 opposite to a flattened contact face 53 thereof is firmly abutted against the center of a face 59 of the second member 55 opposite to a spherically convexed bearing face 57 thereof. At this stage, it should be understood that the face 56 of the first member 54 is formed as an elevated face having the highest point at the center thereof.

On the other hand, the face 59 of the second member 55, i.e., the bottom face of a round recess 58 of the second member 55 is formed as a concavely curved face having the lowest point at the center thereof. Further, as clearly shown in FIG. 8, the curvature of the bottom face 59 of the second member 55 is made larger than that of the elevated face 56 of the first member 54 so that, when the first member 54 is press-fitted in the round recess 58 of the second member 55, a clearance 60 is left in the periphery of the bottom of the round recess 58 of the second member 55. The clearance 60 contributes to achieving the firm abutment of the central highest point of the face 56 against the central lowest point of the curved face 59 during assembly of the first and second members 54 and 55 by press-fitting. This is because, during press-fitting of both members 54 and 55, metal chips scraped from the wall or edge of the round recess 58 of the second member 55 will have a place to settle thereby preventing inclination of the first member 54 in the round recess 58 of the second member 55.

With the firm abutment of the two members 54 and 55 at the center thereof, it is ensured that the flattened face 53 of the first member 54 is able to assume a load at the center thereof while sliding on the face of the swash plate 5 under the application of a large compression load on the shoe 51 by the swash plate 5 and the piston (not shown). As a result, pressure distribution in the flattened face 53 of the first member 54 of the shoe 51 stably extends around the center of the face 56 of the first member 54. consequently, a minute wedge-shape clearance is formed at the periphery of the flattened face 53 of the first member 54 when the shoe 51 slides on the face of the swash plate 5. The formation of such a wedge-shape clearance is effective for the introduction of a lubricating oil into the clearance. Therefore, the resistance to seizure of the first member 54 made of ceramic is enhanced.

It should be understood that, when press-fitting both members 54 and 55, the interference is selected to be from 20 through 200 microns and the press-fitting force is selected to be from 0.5 through 2.0 tons.

It should be also understood that the press-fitting construction of the first and second member 54 and 55 may be modified in such a manner that the face 56 of the first member 54 is formed as a concavely curved face and the face 59 of the second member 59 is formed as an outwardly elevated face. Of course, the inner clearance 60 must be formed by making the curvature of the concavely curved face 56 larger than that of the elevated face 59. In another modification, the elevated face 56 of the first member 54 of FIG. 8 may be shaped as a conical face having a round portion at the center thereof. In a further modification, the concavely curved face 59 of the second member 55 of FIG. 8 may be a plane face or an outwardly elevated face.

Figure 9:
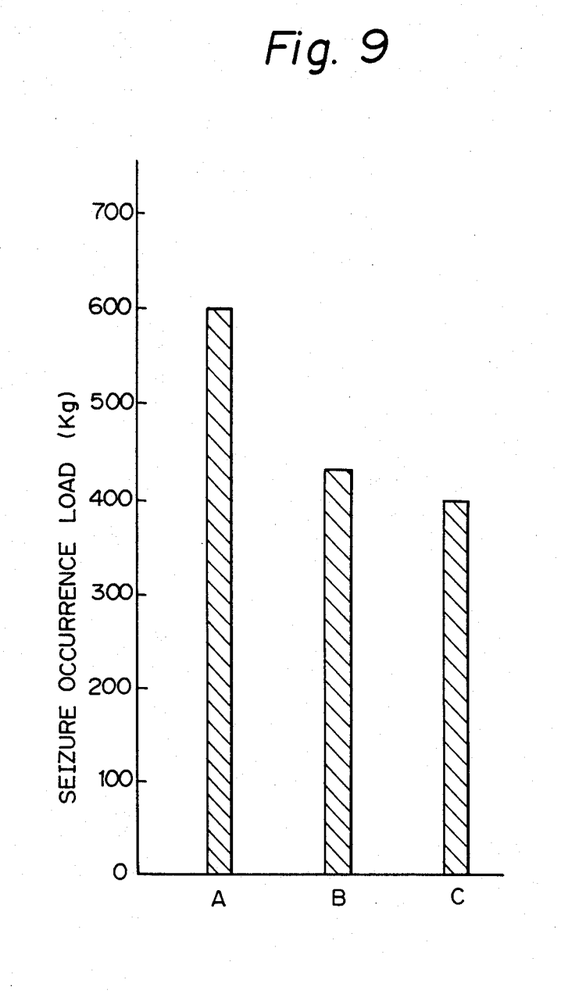
FIG. 9 is a diagram illustrating a result of a test measurement of the seizure-resistance property of shoe A according to the fourth embodiment of the present invention and shoes B and C as controls; and, FIG. 10 is a diagram illustrating a result of measurement of the relationship between a void occupation ratio of the ceramic material and the seizure-resistance property of the shoes according to the fourth embodiment of the present invention.

FIG. 9 is a diagram illustrating the result of a test of resistance to seizure of the shoe A of the fourth embodiment of the present invention and the shoes B and C as controls.

The test was conducted under the condition that the shoes A through C were slid on a swash plate 5 made of aluminum alloy consisting of 14 through 18 wt % silicone, 2.5 through 5 wt % copper, and the remaining wt % aluminum, under an initial load of 40 kg and at a relative speed of 15 m/sec. Lubricating oil including a refrigerator oil and a light oil in a mixing ratio of 1:9 was forcibly applied to the sliding portion. The load was increased by 20 kg at each predetermined time interval. The measurement of the final load causing seizure between each of the shoes A through C and the swash plate was conducted. The measuring result is shown in FIG. 9. It should be noted that the shoe B was formed so that it has a gap of 0.4 mm between the first and second members due to incomplete press-fitting construction. It should be also noted that the shoe C was a conventional shoe having a flattened contact face and a spherical bearing face formed as one part made of bearing steel JIS SUJ 2 and quenched. The first member 54 of the shoe A of the fourth embodiment of the present invention was made of alumina ceramic, and the second member 55 of the shoe A was made of carbon steel of JIS S 45 C.

From the result of the test shown in FIG. 9, it is readily understood that the shoe A has an excellent resistance to seizure compared with the other shoes B and C.

Figure 10:
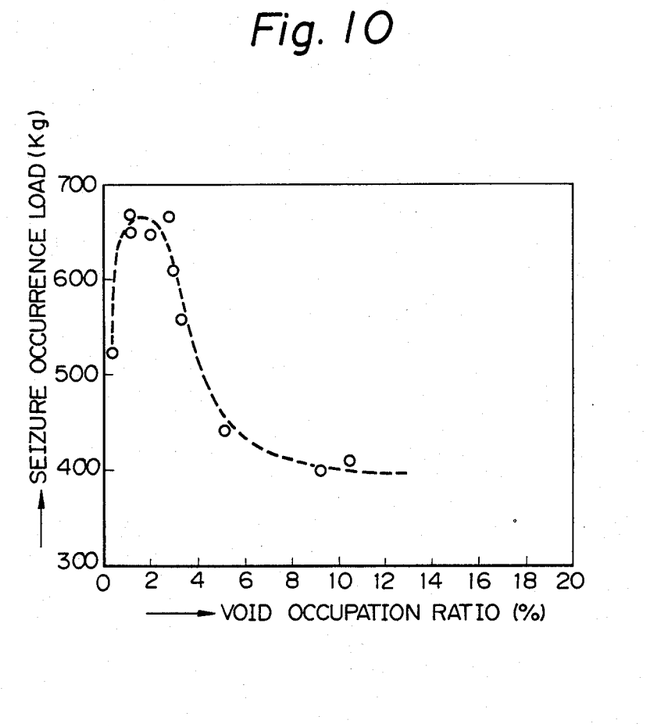

FIG. 10 is a diagram illustrating the result of the same test as that shown in FIG. 7, conducted with the above-mentioned shoe A under the same test condition as that mentioned with the test shown in FIG. 9. From the illustration of FIG. 10, it is again understood that the void occupation ratio of the flattened contact face 53 of the first member 54 of the shoe 55, made of ceramic, should be less than 10% and preferably less than 4%.

From the foregoing description of the preferred embodiments of the present invention, it will be understood that the shoe of the present invention exhibits an excellent resistance to seizure when used for transmitting a drive force from a swash plate of a swash plate type compressor to a reciprocatory piston, even if the compressor is operated under a high compression load. It should be understood that further modification and variations can occur to persons skilled in the art without departing from the scope of the present invention claimed in the appended claims.

I claim:

1. A shoe incorporated into a swash plate type compressor for transmitting an axial force from a rotating swash plate secured to a drive shaft to a piston of the compressor which applies an axially reciprocal compression effect to a refrigerant within a cylinder bore of the compressor, comprising:
   a first member made of a seizure-resistant material and having a first flattened contact face in slidable contact with said swash plate while said swash plate rotates with said drive shaft and a second face opposite to said first flattened contact face, said seizure-resistant material comprising a ceramic material having a void occupation ratio of less than 4%;
   a second member made of a material having less resistance to seizure but more easily machined than said seizure-resistant material of said first member, said second member having a first spherical face slidably engaged with said piston and a second fase opposite to said first spherical face, said material of said second member comprising a ferrous metal; and
   means for joining said first and second members together to form a unitary element.

2. A shoe incorporated into a swash plate type compressor as set forth in claim 1, wherein said ceramic material is selected from at least a group of oxide ceramic, carbide ceramic and nitride ceramic.

3. A shoe incorporated into a swash plate type compressor for transmitting an axial force from a rotating swash plate secured to a drive shaft to a piston of the compressor which applies an axially reciprocal compression effect to a refrigerant within a cylinder bore of the compressor, comprising:
   a first member made of a seizure-resistant material and having a first flattened contact face in slidable contact with said swash plate while said swash plate rotates with said drive shaft and a second face opposite to said first flattened contact face;
   a second member made of a material having less resistance to seizure but more easily machined than said seizure-resistant material of said first member, said second member having a first spherical face slidably engaged with said piston and a second face opposite to said first spherical face;
   means for joining said first and second members together to form a unitary element, said means for joining said first and second members comprising a press-fitting of said first member into said second member;
   said first member being formed as a round plate member having said first flattened contact face and said second face opposite to said first flattened contact face, said round plate member being press-fitted into a round recess formed in said second face of said second member; and
   said second face of said first member being formed as an elevated face having, at a center thereof, a highest point, and wherein said round recess of said second member is formed with a bottom face concavely curved and having, at a center thereof, a lowest point, said highest point of said second face of said first member being abutted against said lowest point of said bottom face of said round recess of said second member.

4. A shoe incorporated into a swash plate type compressor as set forth in claim 3, wherein said elevated face of said second face of said first member has a curvature less than that of said concavely curved face of said bottom face of said round recess of said second member, whereby a clearance is left in said round recess of said second member in which said first member is press-fitted.

* * * * *